(12) United States Patent
Baumgarte

(10) Patent No.: US 7,039,204 B2
(45) Date of Patent: May 2, 2006

(54) EQUALIZATION FOR AUDIO MIXING

(75) Inventor: Frank Baumgarte, Watchung, NJ (US)

(73) Assignee: Agere Systems Inc., Allentown, PA (US)

( * ) Notice: Subject to any disclaimer, the term of this patent is extended or adjusted under 35 U.S.C. 154(b) by 366 days.

(21) Appl. No.: 10/246,165

(22) Filed: Sep. 18, 2002

(65) Prior Publication Data

US 2003/0235317 A1 Dec. 25, 2003

Related U.S. Application Data

(60) Provisional application No. 60/391,095, filed on Jun. 24, 2002.

(51) Int. Cl.
*H04B 1/00* (2006.01)
(52) U.S. Cl. .................. 381/119; 381/103; 381/107
(58) Field of Classification Search .................. 381/27, 381/17, 18, 119, 98, 103, 104, 107, 108; 704/226, 233
See application file for complete search history.

(56) References Cited

U.S. PATENT DOCUMENTS

| | | | |
|---|---|---|---|
| 5,636,324 A | | 6/1997 | Teh et al. ................ 315/2.35 |
| 5,812,969 A | * | 9/1998 | Barber et al. ............... 704/224 |
| 6,111,958 A | * | 8/2000 | Maher ......................... 381/17 |
| 2004/0032960 A1 | * | 2/2004 | Griesinger ................. 381/104 |

OTHER PUBLICATIONS

Yeoncha Choi et al: "A New Digital Surround Frocessing System for General A/V Sources" Nov. 11, 1995, IEEE Transactions on Consumer Electronics, IEEE Inc. New York, US vol. 41, No. 4, pp. 1174-1180.*

"A New Digital Surround Processing System for General A/V Sources", by Yeongha Choi et al., IEEE Tranactions on Consumer Electronics, New York, vol. 41, No. 4, Nov. 1, 1995,, pp. 1174-1180, XP000553496.

"One-Shot Digital Equalization for Nonlinear Modulations", by Angelo Bernardini et al., Conference Proceedings Article, Mar. 19, 1992, pp. 252-263.

"DSP-Implementation of a Multiband Loudness Correction Hearing Aid", by Thomas Fröhlich et al., Proceedings of the Annual *International Conference of the IEEE* Orlando, Florida, Oct. 3-Nov. 31, 1991, pp. 1889-1890.

* cited by examiner

*Primary Examiner*—Brian T. Pendleton

(57) ABSTRACT

During mixing of an N-channel input signal to generate an M-channel output signal, the mixed channel signals are equalized (e.g., amplified) to maintain the overall energy/loudness level of the output signal substantially equal to the overall energy/loudness level of the input signal. In one embodiment, the N input channel signals are converted to the frequency domain on a frame-by-frame basis, and the overall spectral loudness of the N-channel input signal is estimated. After mixing the spectral components for the N input channel signals (e.g., using weighted summation), the overall spectral loudness of the resulting M mixed channel signals is also estimated. A frequency-dependent gain factor, which is based on the two loudness estimates, is applied to the spectral components of the M mixed channel signals to generate M equalized mixed channel signals. The M-channel output signal is generated by converting the M equalized mixed channel signals to the time domain.

23 Claims, 2 Drawing Sheets

US 7,039,204 B2

EQUALIZATION FOR AUDIO MIXING

CROSS-REFERENCE TO RELATED APPLICATIONS

This application claims the benefit of the filing date of U.S. provisional application No. 60/391,095, filed on Jun. 24, 2002.

BACKGROUND OF THE INVENTION

1. Field of the Invention

The present invention relates to audio signal processing and, in particular, to mixing audio signals.

2. Description of the Related Art

A common problem in many areas of audio recording, audio production, and audio coding is the mixing of a number of input audio channels to generate a different number of output audio channels. The change in the number of channels can be motivated by, e.g., a difference between the number of audio tracks (channels) of the recording device and the number of channels supported by the playback system or a difference between the number of channels of the distribution medium (e.g., CD, DVD, radio) and the number of channels supported by the playback system.

One example is FM radio where audio is usually delivered as a two-channel stereo signal, but many receivers have only one playback channel (one loudspeaker). In such case, the two stereo channels are typically down-mixed to form a single mono audio signal for playback. Another example of down-mixing occurs when the multiple (e.g., five) channels of an input signal conforming to a surround audio format, e.g., 5.1 surround, are down-mixed for playback, e.g., using a two-channel stereo system.

In addition to down-mixing (i.e., where the number of output channels is less than the number of input channels), mixing of audio signals may involve up-mixing (i.e., where the number of output channels is greater than the number of input channels). An example of up-mixing is the generation of a three-channel output signal (e.g., left, right, and center) from a two-channel (e.g., left, right) input signal.

Both down-mixing and up-mixing should be performed using processes that degrade the spatial image quality as little as possible. In a conventional mixing process, each output channel is derived from a weighted summation of the input channels in the time domain, where "panning laws" or "matrixing schemes" are applied to determine the weight of each input channel for each output channel.

By operating on signals in the time domain, conventional mixing techniques are applied to the full bandwidth of the audio channels. One drawback of such mixing techniques is a possible loss of spectral energy and/or loudness when some of the spectral components of the input audio channels are not aligned in phase. Such phase differences commonly occur, for instance, in multiple-microphone recordings, when each microphone has a different distance to the sound source. As a result, different phases are introduced in the microphone signals. In the extreme case of a 180-degree phase shift between two input channels of the same amplitude, an output channel composed of the input-channel sum would have zero energy since the input signals would cancel each other. In a realistic scenario, the signal energy and/or loudness can significantly drop for some spectral components in the output channels due to the misaligned signal phases. This energy/loudness loss is audible as a coloration effect.

Coloration effects were studied to a large extent in the framework of the "mono-compatibility" problem at the time when two-channel stereo sound was widely introduced in the 1950's and 60's. See, e.g., F. K. Harvey and E. H. Uecke, "Compatibility problems in two-channel stereophonic recordings," $13^{th}$ AES meeting, preprint 197, October 1961, the teachings of which are incorporated herein by reference. The goal of these studies was to find ways to create a two-channel stereo signal that would largely maintain the perceived loudness over frequency when both channels are mixed to mono. Some sample solutions are to impose a phase shift of +45 and −45 degrees on the left and right audio signals, respectively, before summation or to use coincidence microphones for the recording (where both microphones have the same distance from the sound source). Although these techniques tend to reduce the coloration effect for particular situations, there are many audio processing applications in which these techniques either cannot be applied and/or will not provide satisfactory results.

SUMMARY OF THE INVENTION

The problems of the prior art are addressed in accordance with principles of the present invention by an equalized mixing technique that enables the energy and/or loudness levels of a mixer's output signals to match the energy and/or loudness levels of the mixer's input signals, such that coloration effects are reduced and possibly avoided. In one embodiment, the time-domain channel signals of an N-channel input signal are transformed to a frequency domain, where the resulting spectral components are mixed and then adaptively amplified in order to adjust for loss of spectral energy and/or loudness during the mixing process. An inverse transform is then applied to the resulting equalized mixed channel spectra to generate the time-domain channel signals of an M-channel output signal.

According to one embodiment, the present invention is a method for mixing an N-channel input audio signal to generate an M-channel output audio signal, where N and M are positive integers. According to the method, a first loudness measure is generated for the N-channel input audio signal. The N input channel signals corresponding to the N-channel input audio signal are mixed to generate M mixed channel signals, and a second loudness measure is generated for the M mixed channel signals. The M mixed channel signals are equalized based on the first and second loudness measures to generate the M-channel output audio signal.

According to another embodiment, the present invention is an M-channel output audio signal generated by the previously described method.

According to yet another embodiment, the present invention is an apparatus for mixing an N-channel input audio signal to generate an M-channel output audio signal, where N and M are positive integers. The apparatus comprises a mixer, one or more loudness estimators, and an equalizer. The mixer is configured to mix N input channel signals corresponding to the N-channel input audio signal to generate M mixed channel signals. The one or more loudness estimators are configured to generate a first loudness measure for the N-channel input audio signal and a second loudness measure for the M mixed channel signals. The equalizer is configured to equalize the M mixed channel signals based on the first and second loudness measures to generate the M-channel output audio signal.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
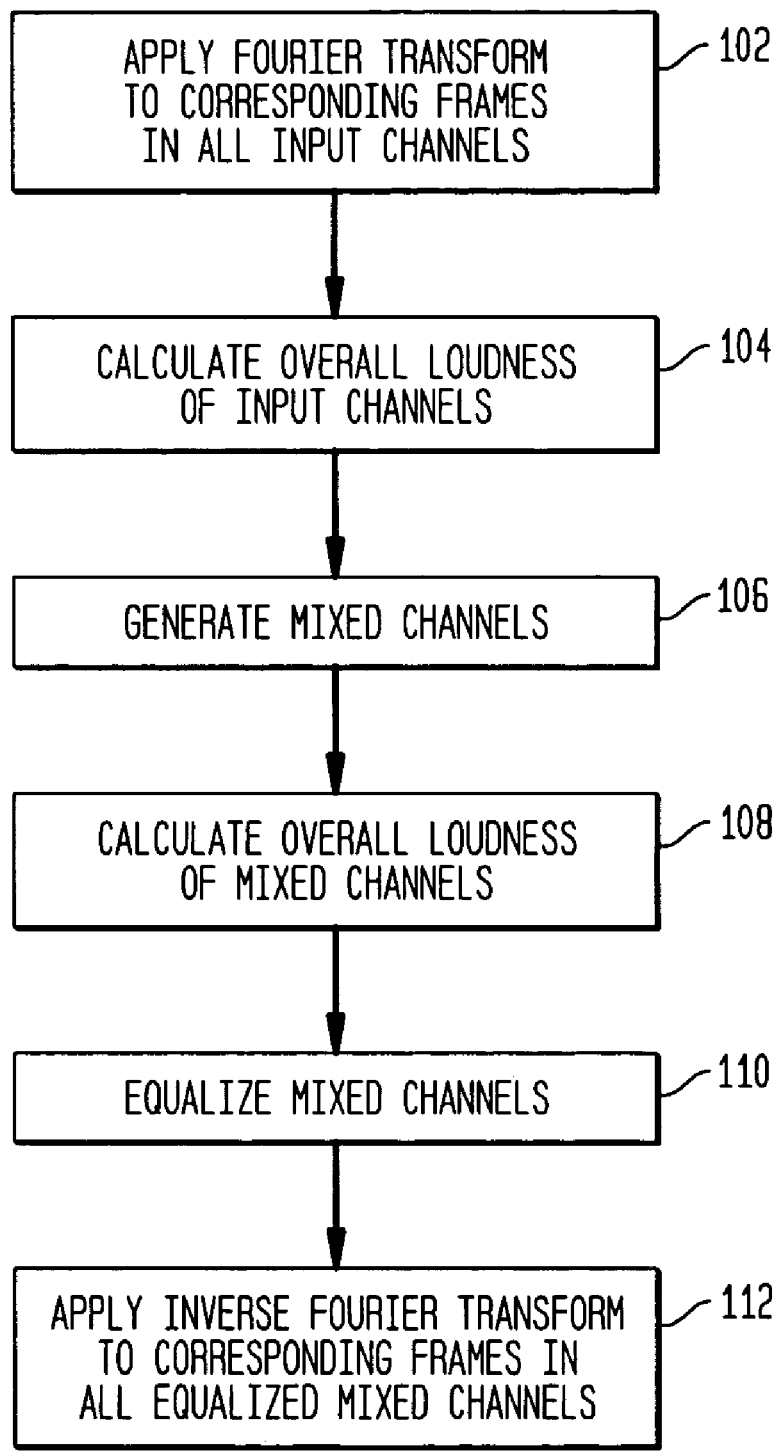
FIG. 1 shows a flow diagram of an equalized mixing procedure, according to one embodiment of the present invention.

FIG. 1 shows a flow diagram of an equalized mixing procedure, according to one embodiment of the present invention. In particular, the processing of FIG. 1 corresponds to the mixing of an N-channel input signal to generate an M-channel output signal, where the input signal has N time-domain channel signals $x_n(t)$, $n=1, \ldots, N$, and the output signal has M time-domain channel signals $y'_m(t)$, $m=1, \ldots, M$. For down-mixing applications, $N > M \geq 1$. For example, when down-mixing a stereo input signal to a mono output signal, $N=2$ and $M=1$. For up-mixing applications, $1 \leq N < M$. For example, when up-mixing a stereo input signal to a three-channel output signal, $N=2$ and $M=3$. It is also possible for a mixing application to have the same number of input and output channels (i.e., $N=M>2$).

According to the processing of FIG. 1, a short-time Fourier transform (STFT) is applied to frames of each time-domain input channel signal (step 102), where the complex STFT transform of a short-time frame with index k of input channel signal $x_{n,k}(t)$ is denoted as $X_{n,k}(\omega)$. In order to improve the spectral resolution, the STFT transform preferably includes the application of a window function when generating each time-domain signal frame from a continuous time signal. According to a typical window function, consecutive windows overlap in time, e.g., by 50% of the length of each window.

After transforming frame k for each of the N input channel signals, the overall short-time spectral loudness $\Gamma_k$ of frame k of the N-channel input signal is calculated (step 104), according to Equation (1) as follows:

$$\Gamma_k(\omega) = \sum_{n=1}^{N} |X_{n,k}(\omega)|^\beta, \tag{1}$$

where the exponent $\beta$ is a constant larger than 1. Loudness is a perceptual quantity that is typically approximated from physical quantities by a model, when direct measurement of the perceived loudness is unavailable. One possible model for loudness is based on the assumption that loudness is equal to the signal energy, which corresponds to $\beta=2$ in Equation (2). This value represents an average that is applicable to a variety of audio material and playback scenarios. Depending on the particular application, however, a different choice of $\beta$ (i.e., either greater than or less than 2) could lead to a more precise loudness approximation in certain situations. For example, the optimum choice of $\beta$ may depend on many factors, including loudspeaker location, the acoustical properties of the playback system (e.g., monophonic, stereophonic, headphones), and the playback level.

The spectral components $X_{n,k}(\omega)$ for frame k of the N-channel input signal are mixed to generate M sets of spectral components $Y_{m,k}(\omega)$ for frame k of the M-channel output signal (step 106). Depending on the particular application, any suitable mixing algorithm may be applied to generate the mixed spectral components $Y_{m,k}(\omega)$, including the weighted summation techniques described in the Background of the Invention section. One possible weighted summation technique is represented by Equation (2) as follows:

$$Y_{m,k}(\omega) = \sum_{n=1}^{N} W_{m,n} X_{n,k}(\omega), \tag{2}$$

where $W_{m,n}$ is the weight applied to the $n^{th}$ input spectral component $X_{n,k}(\omega)$ when generating the $m^{th}$ mixed spectral component $Y_{m,k}(\omega)$.

The overall short-time spectral loudness $\Lambda_k$ of frame k of the M mixed channels is calculated (step 108), according to Equation (3) as follows:

$$\Lambda_k(\omega) = \sum_{m=1}^{M} |Y_{m,k}(\omega)|^\beta. \tag{3}$$

The two spectral loudness estimates $\Gamma_k$ and $\Lambda_k$ are preferably smoothed over time, according to Equations (4) and (5) as follows:

$$\overline{\Gamma}_k(\omega) = \alpha \cdot \overline{\Gamma}_{k-1}(\omega) + (1-\alpha)\Gamma_k(\omega) \tag{4}$$

$$\overline{\Lambda}_k(\omega) = \alpha \cdot \overline{\Lambda}_{k-1}(\omega) + (1-\alpha)\Lambda_k(\omega) \tag{5}$$

The weighting factor $\alpha$ determines the time-domain smoothing in Equations (4) and (5) of the loudness estimates from Equations (1) and (3), respectively. In preferred implementations, $\alpha$ is a constant chosen from the range of 0 to 1. If $\alpha=0$, then no smoothing is done. The smoothed loudness estimates from Equations (4) and (5) will have smaller variations over time when $\alpha$ is larger. A suitable value is $\alpha=0.9$, if the loudness estimates are updated every 16 msec with respect to the real-time audio signal. The initial smoothed loudness estimates $\overline{\Gamma}_0(\omega)$ and $\overline{\Lambda}_0(\omega)$ are preferably initialized to zero.

The mixed spectral components $Y_{m,k}(\omega)$ are equalized (step 110) to generate equalized mixed spectral components $$Y'_{m,k}(\omega),$$

according to Equation (6) as follows:

$$Y'_{m,k}(\omega) = g_k(\omega) Y_{m,k}(\omega), \tag{6}$$

where $g_k(\omega)$ is a frequency-dependent gain factor that is preferably generated from the smoothed loudness estimates $\Gamma_k$ and $\Lambda_k$, according to Equation (7) as follows:

$$g_k(\omega) = \left[\frac{\Gamma_k(\omega)}{\Lambda_k(\omega)+\varepsilon}\right]^{\frac{1}{\beta}}. \qquad (7)$$

The denominator of Equation (7) preferably includes a small positive constant $\varepsilon$ (e.g., 100 dB below the maximum signal level) to avoid a division by zero. In preferred implementations, the equalization of step 110 is intended to ensure that the M-channel output signal has equal estimated loudness as the original N-channel input signal.

The time-domain channel signals $y'_m(t)$ of the M-channel output signal are then generated by applying an inverse STFT transform to each equalized mixed spectrum $$Y'_{m,k}(\omega)$$

(step 112). When overlapping frames are employed, an overlap-add procedure with the previous frame should be implemented.

Figure 2:
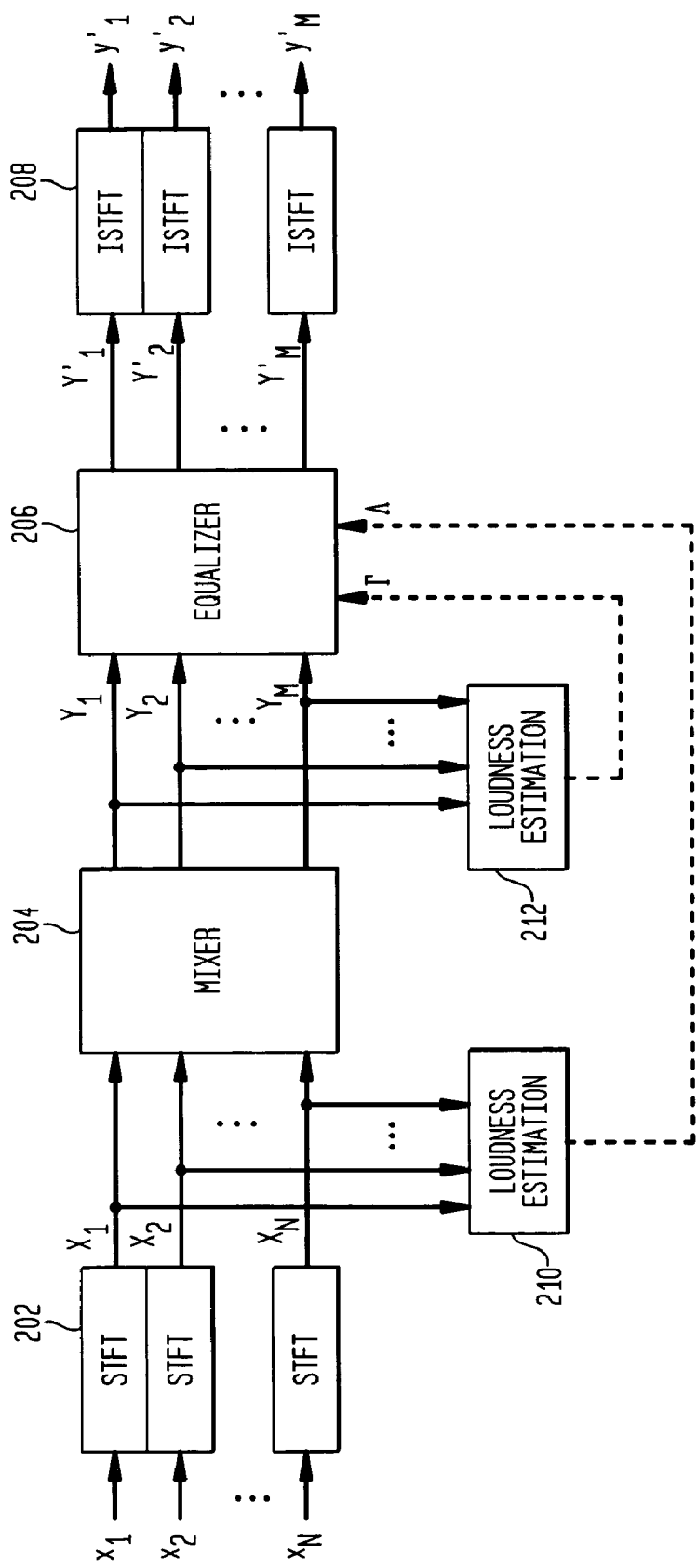
FIG. 2 shows a block diagram of an equalized mixer, according to one embodiment of the present invention.

FIG. 2 shows a block diagram of an equalized mixer 200, according to one embodiment of the present invention. Equalized mixer 200 is configured to perform the processing of FIG. 1. As shown in FIG. 2, equalized mixer 200 has N short-time Fourier transform (STFT) blocks 202, a frequency-domain mixer 204, a frequency-domain equalizer 206, and M inverse short-time Fourier transform (ISTFT) blocks 208. In addition, equalized mixer 200 has two loudness estimation blocks 210 and 212. Each transform block 202 performs part of step 102 of FIG. 1 to transform a different channel signal of an N-channel input signal into the frequency domain. Loudness estimation block 210 performs step 104 of FIG. 1 to calculate (and smooth) the overall estimated loudness $\Gamma$ of the N-channel input signal. Mixer 204 performs step 106 of FIG. 1 to generate M mixed spectra. Loudness estimation block 212 performs step 108 of FIG. 1 to calculate (and smooth) the overall estimated loudness $\Lambda$ of the M mixed spectra. Equalizer 206 performs step 110 of FIG. 1 to equalize the M mixed spectra. Each ISTFT block 208 performs part of step 112 of FIG. 1 to transform a different one of the resulting M equalized mixed spectra to the time domain, thereby generating a different channel of an M-channel output signal.

Although equalized mixer 200 has been depicted with N different transform blocks operating in parallel and M different inverse transform blocks operating in parallel, in alternative embodiments, as few as one transform block and/or as few as one inverse transform block can be operated in a serial, time-multiplexed manner to process multiple, different signals. Similarly, an equalized mixer of the present invention can be implemented using a single loudness estimator that generates overall spectral loudness measures for both the N input channel signals and the M mixed channel signals.

Although the present invention has been described in the context of continuous time t and continuous frequency $\omega$, the present invention can also be implemented in discrete time and discrete frequency, e.g., using a discrete Fourier transform (DFT). Moreover, the present invention is not limited to Fourier transforms, be they continuous or discrete.

In general, the present invention can be implemented using any suitable orthogonal transform or filter bank that is, preferably, energy preserving. In theory, it is also possible to implement the equalized mixing of the present invention in the time domain using adaptive filtering.

The mixing techniques of the present invention can be applied in many different audio coding and sound engineering applications involving the mixing of audio signals, especially those that deal with the whole audio bandwidth, without having the problem of merging different generated parts of the spectrum. According to the present invention, the mixing process is improved by "spectral equalization," wherein the total spectral energy and/or loudness of all output channels is maintained approximately equal to the total spectral energy and/or loudness of all input channels. The present invention can also be implemented in partial-bandwidth applications, in which equalized mixing is performed on only one or more portions of the full bandwidth of the audio signals.

The present invention may be implemented as circuit-based processes, including possible implementation on a single integrated circuit. As would be apparent to one skilled in the art, various functions of circuit elements may also be implemented as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A method for mixing an N-channel input audio signal to generate an M-channel output audio signal, where N and M are positive integers, the method comprising the steps of:
    (a) transforming the N-channel input audio signal from a time domain into a frequency domain;
    (b) generating a first spectral loudness measure for the N-channel input audio signal;
    (c) mixing N frequency-domain input channel signals corresponding to the N-channel input audio signal to generate M frequency-domain mixed channel signals;
    (d) generating a second spectral loudness measure for the M frequency-domain mixed channel signals;

(e) equalizing the M frequency-domain mixed channel signals using a frequency-dependent gain factor that is based on the first and second spectral loudness measures to generate M equalized mixed channel signals; and (f) transforming the M equalized mixed channel signals from the frequency domain into the time domain to generate the M-channel output audio signal.

2. The invention of claim 1, wherein step (e) comprises the step of amplifying the M frequency-domain mixed channel signals using the frequency-dependent gain factor that is based on the first and second spectral loudness measures to maintain the overall spectral loudness of the M-channel output audio signal substantially equal to the overall spectral loudness of the N-channel input audio signal.

3. The invention of claim 1, wherein the first and second spectral loudness measures are smoothed over time.

4. The invention of claim 1, wherein:
step (a)(1) comprises the step of applying a short-time Fourier transfonn (STFT) to each frame of each input channel signal; and
step (d)(2) comprises the step of applying an inverse STFT (ISTFT) to each frame of each equalized mixed channel signal.

5. The invention of claim 4, wherein consecutive frames of each input channel signal overlap in time.

6. The invention of claim 5, wherein:
step (b) comprises the step of mixing based on weighted summation to generate the M frequency-domain mixed channel signals from the N frequency-domain input channel signals;
step (e) comprises the step of amplifying the M frequency-domain mixed channel signals using the frequency-dependent gain factor that is based on the first and second spectral loudness measures to maintain the overall spectral loudness of the M-channel output audio signal substantially equal to the overall spectral loudness of the N-channel input audio signal;
the first and second spectral loudness measures are smoothed over time;
when N>M, the N-channel input audio signal is downmixed to generate the M-channel output audio signal; and
when N<M, the N-channel input audio signal is up-mixed to generate the M-channel output audio signal.

7. The invention of claim 1, wherein:
when N>M, the N-channel input audio signal is downmixed to generate the M-channel output audio signal; and
when N<M, the N-channel input audio signal is up-mixed to generate the M-channel output audio signal.

8. The invention of claim 1, wherein step (c) comprises the step of mixing based on weighted summation to generate the M frequency-domain mixed channel signals from the N frequency-domain input channel signals.

9. An M-channel output audio signal generated by:
(a) transforming the N-channel input audio signal from a time domain into a frequency domain;
(b) generating a first spectral loudness measure for the N-channel input audio signal;
(c) mixing N frequency-domain input channel signals corresponding to the N-channel input audio signal to generate M frequency-domain mixed channel signals, where N and M are positive integers;
(d) generating a second spectral loudness measure for the M frequency-domain mixed channel signals;

(e) equalizing the M frequency-domain mixed channel signals using a frequency-dependent gain factor that is based on the first and second spectral loudness measures to generate M equalized mixed channel signals; and (f) transforming the M equalized mixed channel signals from the frequency domain into the time domain to generate the M-channel output audio signal.

10. The invention of claim 9, wherein step (e) comprises the step of amplifying the M frequency-domain mixed channel signals using the frequency-dependent gain factor to maintain the overall spectral loudness of the M-channel output audio signal substantially equal to the overall spectral loudness of the N-channel input audio signal.

11. The invention of claim 9, wherein the first and second spectral loudness measures are smoothed over time.

12. An apparatus for mixing an N-channel input audio signal to generate an M-channel output audio signal, where N and M are positive integers, the apparatus comprising:
a set of one or more transform blocks configured to transform the N-channel input audio signal from a time domain into a frequency domain;
a mixer configured to mix N frequency-domain input channel signals corresponding to the N-channel input audio signal to generate M frequency-domain mixed channel signals;
one or more loudness estimators configured to generate a first spectral loudness measure for the N-channel input audio signal and a second spectral loudness measure for the M frequency-domain mixed channel signals;
an equalizer configured to equalize the M frequency-domain mixed channel signals using a frequency-dependent gain factor that is based on the first and second spectral loudness measures to generate M equalized mixed channel signals; and
a set of one or more inverse transform blocks configured to transform the M equalized mixed channel signals from the frequency domain into the time domain to generate the M-channel output audio signal.

13. The invention of claim 12, wherein the equalizer is configured to amplify the M frequency-domain mixed channel signals using the frequency-dependent gain factor that is based on the first and second spectral loudness measures to maintain overall spectral loudness of the M-channel output audio signal substantially equal to the overall spectral loudness of the N-channel input audio signal.

14. The invention of claim 12, wherein the one or more loudness estimators are configured to smooth the first and second spectral loudness measures over time.

15. The invention of claim 1, wherein the frequency-dependent gain factor $g_k(\omega)$ is given by:

$$g_k(\omega) = \left[\frac{\Gamma_k(\omega)}{\Lambda_k(\omega) + \varepsilon}\right]^{\frac{1}{\beta}},$$

where:
$\Gamma_k(\omega)$ is the first loudness measure;
$\Lambda_k(\omega)$ is the second loudness measure;
$\varepsilon$ is a positive constant; and
$\beta$ is a constant larger than 1.

16. The invention of claim 9, wherein the frequency-dependent gain factor $g_k(\omega)$ is given by:

$$g_k(\omega) = \left[\frac{\Gamma_k(\omega)}{\Lambda_k(\omega)+\varepsilon}\right]^{\frac{1}{\beta}},$$

where:
$\Gamma_k(\omega)$ is the first loudness measure;
$\Lambda_k(\omega)$ is the second loudness measure;
$\epsilon$ is a positive constant; and
$\beta$ is a constant larger than 1.

17. The invention of claim 12, wherein the frequency-dependent gain factor $g_k(\omega)$ is given by:

$$g_k(\omega) = \left[\frac{\Gamma_k(\omega)}{\Lambda_k(\omega)+\varepsilon}\right]^{\frac{1}{\beta}},$$

where:
$\Gamma_k(\omega)$ is the first loudness measure;
$\Lambda_k(\omega)$ is the second loudness measure;
$\epsilon$ is a positive constant; and
$\beta$ is a constant larger than 1.

18. The invention of claim 12, wherein:
the set of one or more transform blocks are adapted to apply a short-time Fourier transform (STFT) to each frame of each input channel signal; and
the set of one or more inverse transform blocks are adapted to apply an inverse STFT (ISTFT) to each frame of each equalized mixed channel signal.

19. The invention of claim 18, wherein consecutive frames of each input channel signal overlap in time.

20. The invention of claim 12, wherein the mixer is adapted to mix based on weighted summation to generate the M frequency-domain mixed channel signals from the N frequency-domain input channel signals.

21. A method for mixing an N-channel input audio signal to generate an M-channel output audio signal, where N and M are positive integers, the method comprising the steps of:
(a) generating a first loudness measure for the N-channel input audio signal;
(b) mixing N input channel signals corresponding to the N-channel input audio signal to generate M mixed channel signals;
(c) generating a second loudness measure for the M mixed channel signals; and
(d) equalizing the M mixed channel signals using a frequency-dependent gain factor that is based on the first and second loudness measures to generate the M-channel output audio signal, wherein the frequency-dependent gain factor $g_k(\omega)$ is given by:

$$g_k(\omega) = \left[\frac{\Gamma_k(\omega)}{\Lambda_k(\omega)+\varepsilon}\right]^{\frac{1}{\beta}},$$

where:
$\Gamma_k(\omega)$ is the first loudness measure;
$\Lambda_k(\omega)$ is the second loudness measure;
$\epsilon$ is a positive constant; and
$\beta$ is a constant larger than 1.

22. An M-channel output audio signal generated by:
(a) generating a first loudness measure for an N-channel input audio signal;
(b) mixing N input channel signals corresponding to the N-channel input audio signal to generate M mixed channel signals, where N and M are positive integers;
(c) generating a second loudness measure for the M mixed channel signals; and
(d) equalizing the M mixed channel signals using a frequency-dependent gain factor that is based on the first and second loudness measures to generate the M-channel output audio signal, wherein the frequency-dependent gain factor $g_k(\omega)$ is given by:

$$g_k(\omega) = \left[\frac{\Gamma_k(\omega)}{\Lambda_k(\omega)+\varepsilon}\right]^{\frac{1}{\beta}},$$

where:
$\Gamma_k(\omega)$ is the first loudness measure;
$\Lambda_k(\omega)$ is the second loudness measure;
$\epsilon$ is a positive constant; and
$\beta$ is a constant larger than 1.

23. An apparatus for mixing an N-channel input audio signal to generate an M-channel output audio signal, where N and M are positive integers, the apparatus comprising:
(a) a mixer configured to mix N input channel signals corresponding to the N-channel input audio signal to generate M mixed channel signals;
(b) one or more loudness estimators configured to generate a first loudness measure for the N-channel input audio signal and a second loudness measure for the M mixed channel signals; and
(c) an equalizer configured to equalize the M mixed channel signals using a frequency-dependent gain factor that is based on the first and second loudness measures to generate the M-channel output audio signal, wherein the frequency-dependent gain factor $g_k(\omega)$ is given by:

$$g_k(\omega) = \left[\frac{\Gamma_k(\omega)}{\Lambda_k(\omega)+\varepsilon}\right]^{\frac{1}{\beta}},$$

where:
$\Gamma_k(\omega)$ is the first loudness measure;
$\Lambda_k(\omega)$ is the second loudness measure;
$\epsilon$ is a positive constant; and
$\beta$ is a constant larger than 1.

* * * * *